United States Patent [19]
Heinzl et al.

[11] Patent Number: 5,645,354
[45] Date of Patent: Jul. 8, 1997

[54] AEROSTATIC BEARING AND METHOD OF MANUFACTURING AN AEROSTATIC BEARING

[76] Inventors: Joachim Heinzl, Dreisesselbergstr. 16, D-81549 Munich; Michael Muth, Wichernweg 12, D-81737 Munich; Bernd Schulz, Albrecht-Dürer-Str. 56b, D-85579 Neubigerg, all of Germany

[21] Appl. No.: 533,226

[22] Filed: Sep. 25, 1995

[30] Foreign Application Priority Data

Oct. 10, 1994 [DE] Germany ................ 44 36 156

[51] Int. Cl.⁶ .................................... F16C 32/06
[52] U.S. Cl. ................................ 384/100; 384/107
[58] Field of Search .......................... 384/100, 107, 384/114

[56] References Cited

U.S. PATENT DOCUMENTS

| | | | |
|---|---|---|---|
| 3,600,046 | 8/1971 | Redmon | 384/12 |
| 4,857,698 | 8/1989 | Perun | 219/121.71 |

FOREIGN PATENT DOCUMENTS

| | | |
|---|---|---|
| 237627 | 9/1987 | European Pat. Off. . |
| 0432958 | 6/1991 | European Pat. Off. . |
| 0578130 | 1/1994 | European Pat. Off. . |
| 1414549 | 9/1965 | France . |
| 3001061 | 7/1980 | Germany . |
| 3230232 | 2/1984 | Germany . |
| 3439648 | 5/1986 | Germany . |
| 9100552 | 1/1991 | WIPO . |

OTHER PUBLICATIONS

Yukitaka Nagano, Laser Drilling, ASM Engineering Bookshelf, pp. 115–121 Dec. 1978.

George Chryssolouris, Lser Machining, pp. 162–163, 208–213, 230–231. Dec. 1991.

H.C. Rofhe, Pressurized Gas Berings, Mechanical Engineering, pp. 45–48. Jun. 1961.

*Primary Examiner*—Thomas R. Hannon
*Attorney, Agent, or Firm*—Anderson Kill & Olick P.C.

[57] ABSTRACT

An aerostatic bearing includes a thin material thickness area having a bearing surface and a back side opposite to the bearing surface, and a plurality of nozzle-forming microholes formed in the thin material layer and having a conical cross-section, with the microholes being drilled with a laser beam applied from the back side, and with the most narrow section of the microholes being located on the bearing surface.

10 Claims, 3 Drawing Sheets

AEROSTATIC BEARING AND METHOD OF MANUFACTURING AN AEROSTATIC BEARING

BACKGROUND OF THE INVENTION

In aerostatic bearings, air from an external air source is fed, under pressure, through one or several throttle openings or nozzles in a clearance between two cooperating bearing surfaces. The fed air creates air cushion having a pressure sufficient to support a load. The pressure in the bearing clearance is sharply reduced from pressure $P_1$ at the nozzle edge to an ambient pressure $P_a$ at the bearing edge. Therefore, to increase the carrying capability, the number of nozzles should be increased. However, the increase of the number of nozzles should be effected without a substantial increase of the manufacturing costs. The chambers and channels which define separate nozzles, which serve for distribution of air in the bearing clearance and thereby influence the increase of the carrying capability, are dimensioned with regard to flow characteristics defining the air flow through the nozzle. The drawback of conventional aerostatic bearings with such chambers and channels consists in that these chamber and channels have a dead volume which increases the tendency of the bearing to self-exciting oscillations.

So-called porous bearings, formed of porous air-permeable material have a large number of separate micronozzles. The micronozzles or air-permeable points are uniformly distributed over the bearing surface providing for a uniform pressure profile along the entire bearing clearance and, thereby, insuring a high carrying or support force. In these bearings, the narrowest cross-section of the micronozzles are not located directly in the bearing surface and, therefore, they have, as the bearings with channels and chambers, a dead volume unfavorable to a dynamic operation. For this reason, methods were developed according to which the porous material on the bearing surface was either purposefully compressed to a certain layer thickness (German Patent No. 3,439,648) or completely closed (German Publication No. 3,230,232) in order to subsequently open this layer in a desired manner. The required processes are difficult to implement, especially, when a predetermined flow resistance of the nozzle layer should be provided and a uniform distribution of nozzle points over the bearing surface need be insured. A compacted porous bearing, in which the compacted layer is again partially open by using a laser, is disclosed in European publication EP-A-0237627. The opening of the layer, or forming the nozzles therein, is effected from the bearing clearance side, which results in worsening of flow characteristics.

Treatment of metals with a laser is described in numerous publications. For example, drilling with a laser is described in an article of Yukitaka Nagano "Laser Drilling" in a ASM Engineering Bookshelf," 1978, pages 115-121. In a book of George Chryssolouris "Laser Machining" on page 209, use of laser drilling for producing "aerosol nozzles" is described. However, the aerosol nozzles referred therein are not nozzles of an air bearing, which should insure the provision of specific flow characteristics.

Different air bearings are disclosed in U.S. Pat. No. 3,600,046 and German Patent No. 3,001,061. In the disclosed bearings, the nozzles have a conical shape. In the bearing disclosed in German Patent No. 3,001,061, grooves are provided on the side of the bearing clearance which adversely affect the dynamic behavior of the air bearing.

In the magazine "Mechanical Engineering," June, 1961, pages 45-48, there is disclosed a bearing to the improvement of which the present invention is directed. In the bearing described therein, the micronozzle region is formed as a foil in which the microholes are formed with a needle mechanically.

Accordingly, an object of the invention is an aerostatic bearing having good static and dynamic characteristics and which can be manufactured at a relatively low cost.

SUMMARY OF THE INVENTION

This and other objects of the invention, which will become apparent hereinafter, are achieved by providing a bearing having a thin material thickness area in which nozzle-forming microholes having a conical cross-section are drilled with a laser beam applied from a back side of the layer, which is opposite to the bearing surface, with the narrowest sections of the microholes being located in the bearing surface. At that, the bearing surface is treated to the predetermined shape and dimensional tolerances before the microholes are drilled.

The advantage of the invention consists in that a very large number of nozzles can be formed in the bearing surface so that very good static characteristics, similar to those of an aerostatic bearing from a porous material, are achieved. Further, good dynamic characteristics, similar to those of a compacted surface of the porous bearing, are achieved by locating the narrowest section of the microholes directly in the bearing surface. Other advantages of different types of aerostatic bearings are also achievable in the inventive bearing, with small manufacturing expenses.

A further advantage of the invention consists in that laser drilling of nozzles is possible even in bearings with unfavorable geometric characteristics, e.g., in a cylindrical bearing having a small diameter. A further advantage of the aerostatic bearing according to the present invention consists in that forming of nozzles with a laser is facilitated by a targeted weakening of material in the nozzle region, so that by a predetermined control of the laser beam during drilling of microholes, a required flow resistance of the bearing surface can be achieved in a simple way with a high level of reproducibility. Thereby, the flow rate of a separate nozzle can be very low, so that a very large number of nozzles can be formed to provide for a high static carrying or support force, without increasing the flow rate to an extent that economical operation is not anymore possible. Further, drilling from the back side insures that a targeted energy supply can be obtained so that the narrowest section of nozzles lies directly in the bearing surface, and no burrs are formed thereat. Thereby, a subsequent treatment of the bearing surface to obtain predetermined shape and dimensional tolerances is eliminated.

Laser drilling permits to obtain an arbitrary distribution of nozzles in the bearing surface, which permits to adapt the bearing to predetermined load characteristics.

The process of forming the inventive bearing can be easily automatized. The manufacturing costs can be very low so that the bearing can be produced in a very large quantity.

During the drilling of the microholes with a laser beam, the application of the laser beam can be so controlled that conical microholes are formed with high burrs at their entrances for increasing a throttling length to thereby reduce the flow turbulence, and that appearance of burrs at microholes exists is prevented. Further, it is contemplated to provide sensor means at the bearing surface for sensing appearance of the laser beam thereat, and to interrupt the drilling by cutting off the laser beam upon the sensor generating a signal indicating that a predetermined threshold value of a smallest cross-section of a microhole, which is located in the bearing surface, is achieved.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
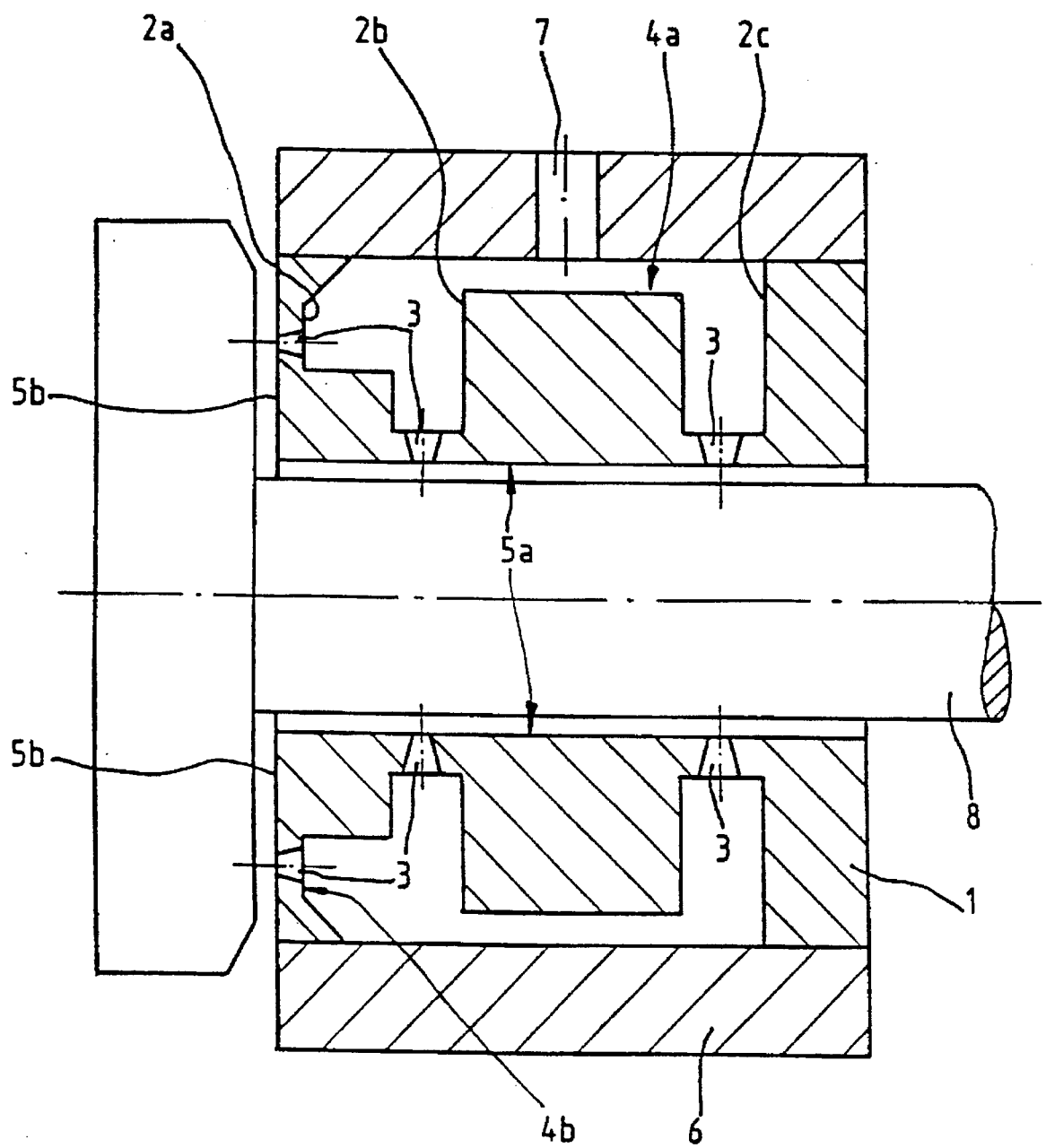
FIG. 1 shows a cross-sectional view of an aerostatic bearing according to the present invention.

The aerostatic bearing shown in FIG. 1 is a combination radial thrust bearing. The bearing body 1 has an axial annular groove 2a and two radial grooves 2b and 2c. The grooves 2a, 2b, and 2c provide for a predetermined decrease of the material thickness in the region of holes 3 which form the nozzles. In these predetermined weakened regions, conically-shaped holes 3 are formed in bearing surfaces 5a, 5b with a laser from the bearing back sides 4a, 4b. The bearing body 1 is located in a ring 6 having a feed opening 7 through which air is fed. Thus, a shaft 8 is supported on air cushions formed by axially and radially arranged rows of holes 3. A cone inference fit between the bearing body 1 and the ring 6 provides for uniform decrease of the bearing diameter and, thus, of the bearing clearance width along the entire length of the bearing.

Figure 2:
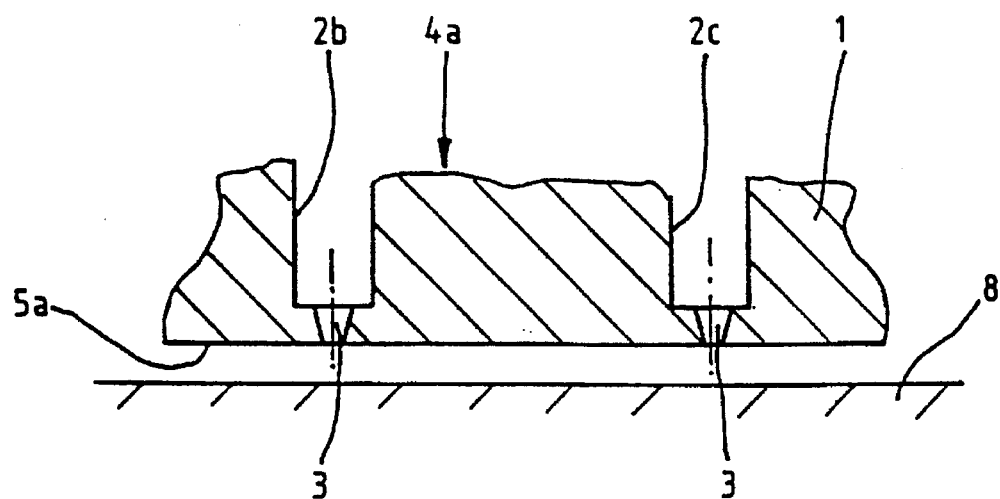
FIG. 2 shows a cut-out of the view shown in FIG. 1.

In cut-out of FIG. 2, two holes 3, can be formed in the bearing surface 5a by a targeted feed of energy of a laser beam from the back tide 4a, without any burrs, so that the surface 5a would not require any further machining. The holes represent conically-shaped microholes, the most narrow section of which forms the nozzles of the aerostatic bearing in the bearing surface 5a.

Figure 3:
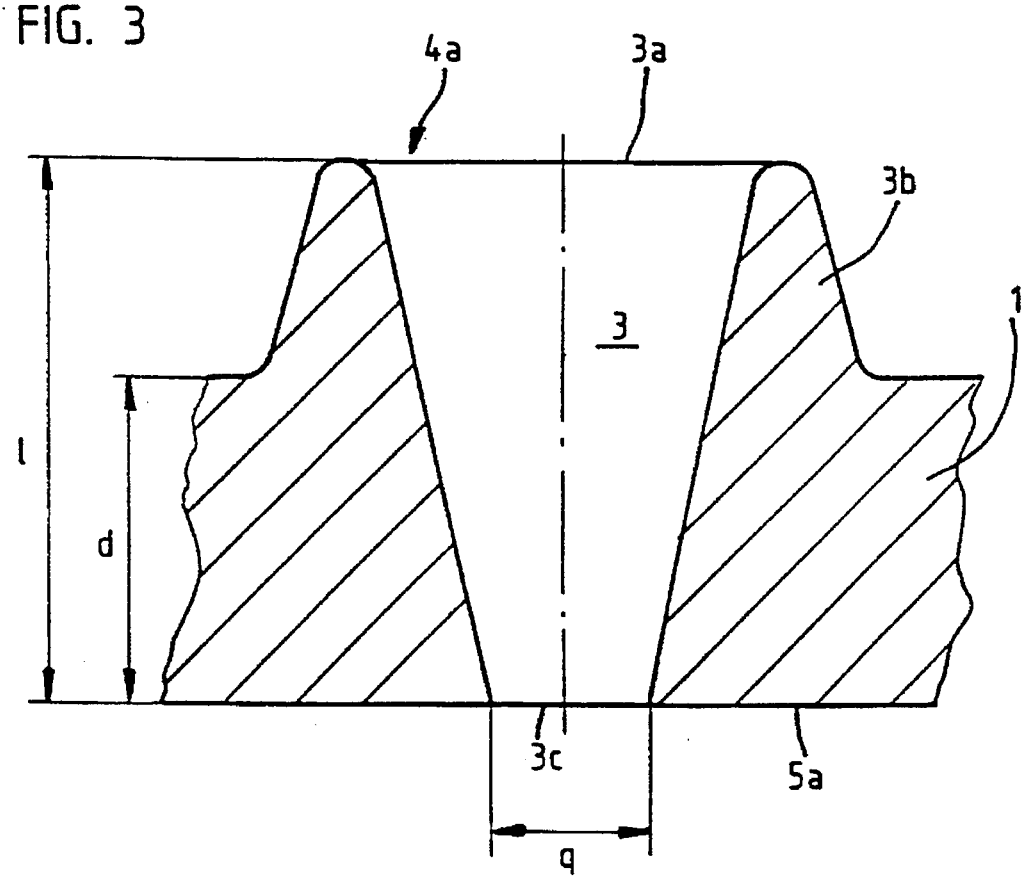
FIG. 3 shows a detailed view of a nozzle shown in FIG. 2.

FIG. 3 shows an advantageous embodiment of holes 3 at an increased scale and in detail. The feed of the laser beam energy is so controlled that at the hole entrance 3a and thus, on the back side 4a, a high burr 3b is formed for increasing the throttling length, whereby the flow turbulence is reduced. The reduction in the flow turbulence prevents appearance of burrs at the hole exit 3c and, thus, on the bearing surface 5a, so that further treatment of the surface 5a becomes unnecessary. According to the present invention, during drilling of holes 3 with a laser beam, the burrs 3b at the hole entrances 3a, that is opposite the bearing surface 5a, are intentionally formed.

The targeting weakening of the material of the bearing body in the adjacent regions of the holes 3 leaves a thickness from 0.1 mm to 2 mm. This thickness permits drilling of the holes 3 with a laser while simultaneously insuring a sufficient dimensional or structural stability of the bearing body 1 when it is being mounted in the ring 6.

In order to achieve a low turbulence flow of air during its exit from a nozzle, formed by a hole 3, into the bearing clearance and, thereby, to prevent noise even at high air supply pressures, the ratio of the hole length 1 to the smallest hole diameter q on the surface 5 should be larger than or equal to 3, i.e., $1/q>3$ at that, the diameter q should be less than 100 μm and, preferably, less than 50 μm.

To achieve good emergency running characteristics, the bearing is formed of bronze instead of steel.

For example, the bearing body 1 is formed of bronze, whereas, the shaft 8 is formed of steel. For reasons of stability, in the radial thrust bearing, shown in FIG. 1, the bearing body 1 is mounted in a steel ring 6.

Figure 4:
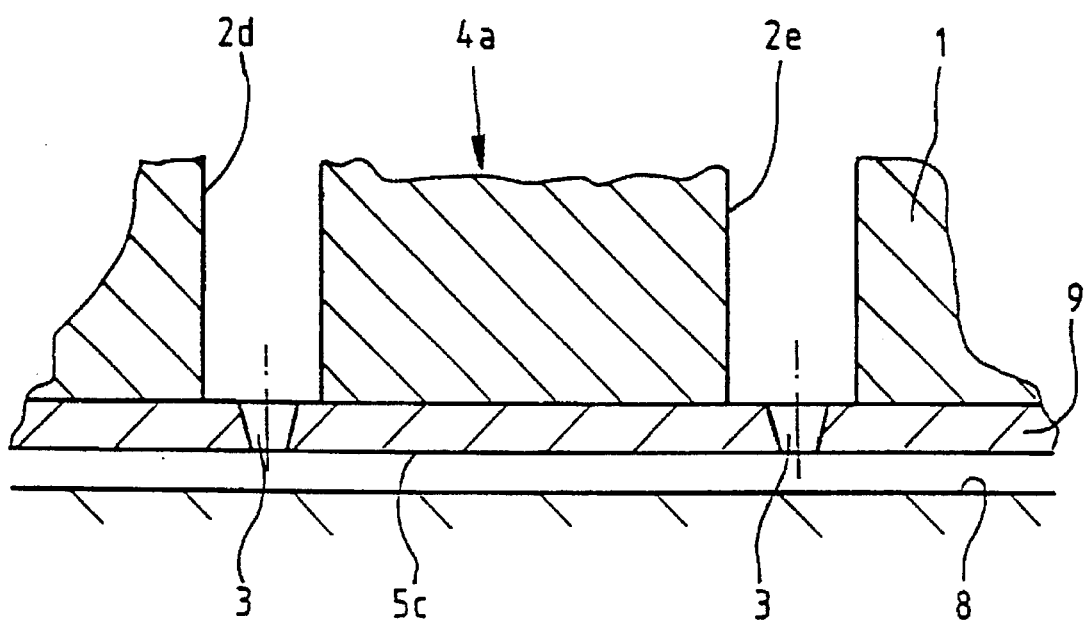
FIG. 4 shows a cross-sectional cut-out view of another embodiment of an aerostatic bearing according to the present invention.

FIG. 4 shows a further embodiment of a radial thrust bearing according to the present invention. In the embodiment show in FIG. 4, the bearing body 1 has, in the regions of holes 3, grooves 2d and 2e. The difference between this and previous embodiments of the inventive bearing, consists in that the grooves 2d, 2e form through-breaks. The reduced material thickness in the regions of holes 3 is formed by a separate part formed as a thin metal foil 9. The holes 3 can be formed in the metal foil 9 by laser drilling before the attachment of the foil 9 to the bearing body 1. Alternatively, the holes 3 can be formed after connecting the bearing body 1 and the foil 9. The advantage of this embodiment of the inventive bearing consists in that the bearing body 1 can be subjected only to the rough treatment and can be formed for example, as a cast workpiece or as a sintered body. Here, likewise, a finishing treatment of the surface 5a, after drilling of the holes 3, is not necessary.

The dimensions of the holes, which were discussed with reference to the embodiment of FIG. 3, should also be retained in the embodiment of FIG. 4. The thickness of the metal foil 9 should likewise be from 0.1 mm to 2 mm. Advantageously, in all of the embodiments, a plurality of holes 3 is provided. A large number of holes at a predetermined total air flow rate can be provided only when the flow rate through a single hole is small. This requires providing holes with a small diameter q. However, a diameter of less than 50 μm makes only sense when the bearing surfaces 5a, 5b, 5c or the foil 9 do not require subsequent treatment. For that reason, it is important that the bearing surfaces 5a, 5b, 5c be treated to the required shape and dimensional tolerances before the drilling of holes 3. A subsequent treatment would clog the holes 3, resulting in deterioration of bearing characteristics.

The novel features of the present invention are equally applicable to linear or slide bearings.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An aerostatic bearing, comprising a thin material thickness area having a bearing surface and a back side opposite to the bearing surface; a plurality of nozzle-forming microholes formed in the thin material area and drilled with a laser beam applied from the back side; and a bearing body, the thin material thickness area forming part of the bearing body, and the bearing body having, in regions directly surrounding the microholes, a targeted material weakness.

2. An aerostatic bearing as set forth in claim 1, comprising separate thin element defining the thin material thickness area, the thin element having a first side defining the bearing surface and a second opposite side defining the back side, the thin element being attached to the bearing body at the second side thereof, the bearing body having openings for feeding the nozzles which have a cross-section larger than a cross-section of the nozzle-forming microholes.

3. An aerostatic bearing as set forth in claim 1, wherein the microholes have a conical cross-section, and wherein a most narrow cross-section of each microhole is located on the bearing surface.

4. An aerostatic bearing as set forth in claim 3, wherein entrances of the microholes, which are located on the back side, are formed with burrs whereby a throttling length of each microhole is increased to thereby reduce flow turbulence.

5. An aerostatic bearing, comprising a thin material thickness area having a bearing surface and a back side opposite to the bearing surface; and a plurality of nozzle-forming microholes formed in the thin material area, wherein the microholes have a conical cross-section and are drilled with a laser beam applied from the back side, wherein a most narrow section of each microhole is located on the bearing surface, and wherein the aerostatic bearing further comprises a bearing body having openings for feeding the nozzles and which have a cross-section larger than a cross-section of the nozzle-forming microholes.

6. An aerostatic bearing as set forth in claim 5, wherein entrances of the microholes, which are located on the back side, are formed with burrs whereby a throttling length of each microhole is increased to thereby reduce flow turbulence.

7. An aerostatic bearing as set forth in claim 5, comprising a separate thin element defining the thin material thickness area, the thin element having a first side defining the bearing surface and a second opposite side defining the back side, the thin element being attached to the bearing body at the second side thereof.

8. An aerostatic bearing as set forth in claim 7, wherein the separate thin element comprises a metal foil.

9. An aerostatic bearing as set forth in claim 5, wherein the thin material area has a thickness, in regions adjacent to the microholes, of 0.1–2 mm.

10. An aerostatic bearing as set forth in claim 5, wherein a ratio of a microhole length to a smallest microhole diameter is greater than or equal to 3.

* * * * *